March 31, 1925. 1,531,595
L. G. CHAIX ET AL
COMMUTATOR
Filed April 24, 1923
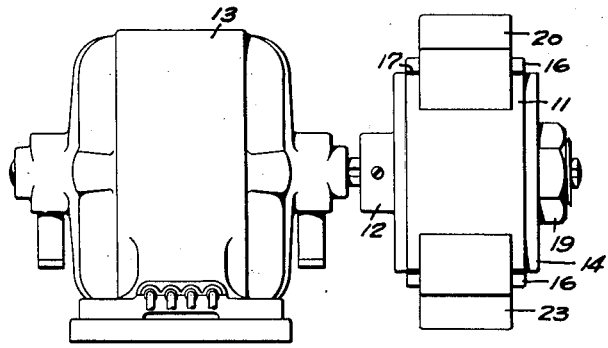
FIG. 1.
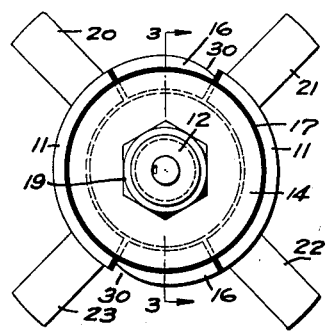
FIG. 2.
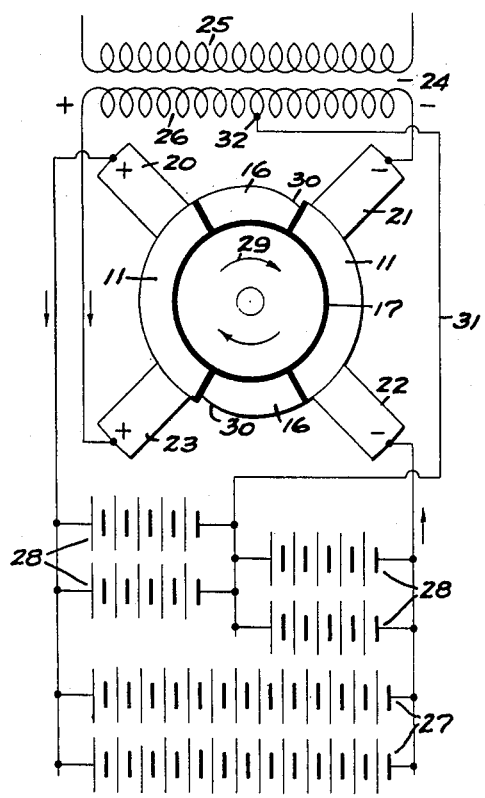
FIG. 4.
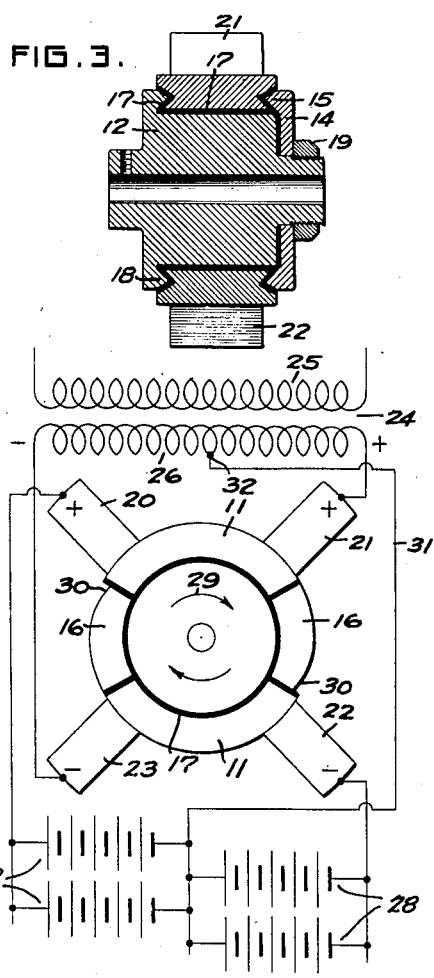
FIG. 3.
FIG. 5.
WITNESS:
H. Sherburne
INVENTORS
Leon G. Chaix
Eugene L. Chaix
BY White Prost Evans
Their ATTORNEYS Patented Mar. 31, 1925.

1,531,595

UNITED STATES PATENT OFFICE.

LEON G. CHAIX AND EUGENE L. CHAIX, OF SAN FRANCISCO, CALIFORNIA, ASSIGNORS TO MORRISON-CHAIX CO., OF SAN FRANCISCO, CALIFORNIA, A CORPORATION OF CALIFORNIA.

COMMUTATOR.

Application filed April 24, 1923. Serial No. 634,288.

*To all whom it may concern:*

Be it known that we, LEON G. CHAIX and EUGENE L. CHAIX, citizens of the United States, and residents of the city and county of San Francisco, in the State of California, have invented a new and useful Commutator, of which the following is a specification.

This invention relates to the rectification of an alternating current, so that it may be suitable for such purposes as charging storage batteries. More particularly our invention relates to a rectifying commutator which is driven at a synchronous speed, and upon which brushes rest for taking off the rectified current.

It is one of the objects of our invention to make it possible for a rectifier of this simple construction to deliver a much larger current than heretofore.

For many purposes it is advantageous not to rectify each half-wave of alternating current completely, but instead to leave the direct current circuit open near the zero portions of the wave. This is especially true in the charging of storage batteries, where otherwise these batteries may cause a reversal of current flow near these portions of the wave. In order to construct a rectifier of this sort, the live segments are separated by an appreciable distance, the intervening space being filled in with an insulated dead segment. We have found that in such arrangements, poor commutation and excessive sparking at the brushes are almost certain to follow after a short interval of use, no matter how carefully the mechanical elements have been constructed. We have discovered the source of these baffling effects, and it is thus still another object of our invention to provide a smooth running commutator for rectification even after extended use.

Our invention possesses other advantageous features, some of which with the foregoing, will be set forth at length in the following description, where we shall outline in full that form of the invention which we have selected for illustration in the drawings accompanying and forming part of the present specification. Although we have shown in the drawings but one embodiment of our invention, we do not desire to be limited thereto, since the invention as expressed in the claims may be embodied in other forms also.

Referring to the drawings:

Figure 1 is a side elevation of a rectifier and its driving motor, embodying our invention;

Fig. 2 is an end elevation of the rectifier shown in Fig. 1;

Fig. 3 is a sectional view along the plane 3—3 of Fig. 2; and

Figs. 4 and 5 are simplified diagrams illustrating the mode of operation of our rectifier.

The rectifier proper comprises a series of conducting segments, such as 11, which are insulatingly supported on a spider 12. This spider is adapted to be driven by a synchronous motor 13, of a construction which will be hereinafter described. The segments 11 may be fastened to the spider in any appropriate manner, as by aid of clamp ring 14 (Fig. 3) which has an annular projection 15 fitting into corresponding grooves in the segments 11. Between the live segments 11 may be disposed the "dead" or filler segments 16 so as to fill out the entire commutator. These segments are all properly insulated by the aid of the material 17, such as mica, which may be disposed in between the segments as well as between them and the adjacent portions of the spider 12 and clamp ring 14. The spider 12 may also be provided with an annular projection or flange 18, between which and the projection 15 of the clamp ring 14, the segments may be tightened, as by the aid of nut 19 threaded on the hub of the spider 12.

The particular mechanical details as just set forth may obviously be varied, and are described herein only by way of an example. The important feature is the use of properly spaced live segments 11, which cooperate with the brushes 20, 21, 22, and 23 when there is relative rotation between them, to rectify an alternating current. The manner in which this is accomplished may be readily understood from an examination of Figs. 4 and 5, which illustrate two different relative positions of the segments and the brushes, and which will now be described.

We preferably use a step down transformer 24 having a primary 25 and secondary 26 for supplying alternating current to the commutator. In this way, it is possible to use the conventional 110 or 220 volt alternating current circuit for charging storage batteries at 7 or 15 volts. The live segments 11 are so arranged that they bridge adjacent brushes for an appreciable time as they are rotated by the motor 13, and in this way they serve to direct the current properly to the load. For this purpose two of the brushes, such as 21 and 23 are connected permanently to the terminals of the secondary coil 26. If we assume that in the position of Fig. 4, the left hand terminal of coil 26 is positive, while the right hand is negative, the brush 23 will serve to conduct the current to brush 20, through one of the segments 11, and this brush 20 in turn serves as the positive terminal for the load, such as batteries 27 and 28. The negative terminal is formed by the brush 22, which in the position of Fig. 4, is connected, by way of a segment 11 and the brush 21, to the right hand terminal of the coil 26. The speed of motor 13 is made such that by the time the polarities of the terminals for coil 26 reverse, the segments have been rotated in the direction of arrows 29 to the position of Fig. 5. For this condition brush 23 is negative and brush 21 is positive. However, since brushes 20 and 21 are connected by a segment 11, and brushes 22 and 23 by another segment 11, the load terminal polarities remain unaltered. Thus brush 20 is still positive and brush 22 negative. For another quarter turn of the commutator the segments and brushes will again be in the position of Fig. 4; at the same time the polarities of the terminals of coil 26 will also be as indicated and the load terminals are maintained at the proper polarity. It is evident that continued rotation if synchronous with the polarity reversals of coil 26 will serve to maintain the load terminals at constant polarity.

In the type of rectifier illustrated in Figs. 4 and 5 a complete sequence or cycle of operations takes place for each 180° of rotation of the rectifier. The particular degree of angular movement may obviously be varied by varying the number of segments, but of course the speed of the driving motor 13 must also be chosen such that the completion of the angular movement occupies exactly the same interval as that of a complete alternating current cycle in the supply leads. Where there are two live segments 11 and where the supply has a frequency of 60 cycles it may be readily shown that the motor 13 must have a synchronous speed of 1800 R. P. M.

The brushes 20, 21, 22, and 23 are so located angularly in space that when segments 11 have just begun bridging them in pairs, that is, when these segments are just closing the circuits between the adjacent brushes, the alternating E. M. F. is appreciably beyond the zero point, and when the segments 11 move away so as to disconnect the brushes, the E. M. F. has returned to substantially the same value as when the connection between the brushes was first completed.

Furthermore segments 11 are purposely made short enough to provide a short interval of open circuit between the brushes while the E. M. F. in the alternating current source is reversing.

The rectifier as thus far described does not differ materially from others which have been already proposed and operated. In attempting to maintain the wearing surface of the rectifier segments smooth, it has been proposed to use dead segments 16 made of the same material (usually copper) as the live segments 11. In this way it was thought that the movement of the brushes over the commutator segments might be maintained smooth, since they would all wear evenly, and without material danger of the brushes jumping away from the segments to cause sparking. In the course of our experiments, we have found that although smooth running may be obtained for a short time with this expedient, it could not be maintained for an indefinite period. We finally discovered that the live segments 11 wear faster than the others, and as the brushes would leave such a live segment, they would be lifted off or forced askew by the projecting edge of the adjacent dead segment. This we found was the cause of substantially all of the sparking; in fact, from a consideration of the mechanical effect of the projecting edge of the dead segment on the brush, it is not at all surprising that commutators of this sort have been considered entirely impracticable for heavy current duty.

Once the cause of the trouble was discovered, we were able by the aid of relatively simple expedients, to overcome it. However, the problem itself was hidden so well that these simple expedients form no criterion whatsoever for the large extent of experimenting necessary to unearth the true cause of the difficulty. In the present instance, the difficulty of uneven wear is overcome by providing a sloping or beveled active surface 30 for the leading side of the dead segments. In this way, even if the live segments 11 wear down an appreciable extent, the brushes will be smoothly guided over onto the dead segments, and sparking will be materially lessened. Although the expedient is simplicity itself, its importance cannot be sufficiently emphasized. It modifies the operating characteristics of the commutator to such an extent that it is entirely feasible to charge a large number of storage batteries in multiple, as indicated in Figs. 4 and 5.

We also show a neutral or third wire connection 31 that leads to the central point 32 of the transformer coil 26. Due to this neutral connection, it is possible to charge low voltage batteries 28, and high voltage batteries 27; the batteries 28 may be connected between the neutral connection 31 and an outside bus, while the high voltage batteries 27 may be connected between the outside busses.

We claim:

1. A commutator having current carrying segments disposed in spaced relation around the commutator, brushes bearing on said commutator, and fillers between the segments, said fillers being so formed near those portions of the current carrying segments at which the current is broken that the brushes as they leave these segments travel smoothly on said fillers when the live segments have been worn by the brushes.

2. A commutator having current carrying segments disposed in space relation around the commutator, brushes bearing on said commutator, and filler segments between the current carrying segments, said filler segments each having a bevelled off edge near that portion of the adjacent current carrying segment where the brushes leave it, whereby the brushes are prevented from jumping away from the current carrying segments on the occurrence of uneven wear of the current carrying and filler segments.

3. A commutator having current carrying segments and filler segments that carry no current, all of said segments having active surfaces on which current collecting devices are adapted to bear, said active surfaces forming only parts of the periphery of a cylinder having its axis coinciding with that of the commutator, each of those filler segments which trail adjacent current carrying segments having that edge bevelled off that is adjacent to the current carrying segment.

4. In a mechanical rectifier, a commutator having current carrying segments, filler segments that carry no current alternating with the current carrying segments, and brushes bearing on said commutator, all of said segments having active surfaces forming only parts of the periphery of a cylinder having its axis coinciding with that of the commutator, each filler segment having a bevelled off edge near that portion of the adjacent current carrying segment where the brushes leave it, said brushes being wider than the bevel, whereby the brushes ride smoothly on said filler segments.

5. In combination, a commutator having current carrying segments, and filler segments, said filler segments each having a bevelled off edge near the leading adjacent current carrying segment, and brushes bearing on said commutator, and angularly spaced a substantial distance apart, each of said brushes passing as a single unit from one segment to the next, whereby the brushes travel smoothly away from the current carrying segments on the occurrence of uneven wear of the current carrying and filler segments.

In testimony whereof, we have hereunto set our hands.

LEON G. CHAIX.
EUGENE L. CHAIX.